July 22, 1969   D. A. GRABER   3,456,441
FUEL NOZZLE

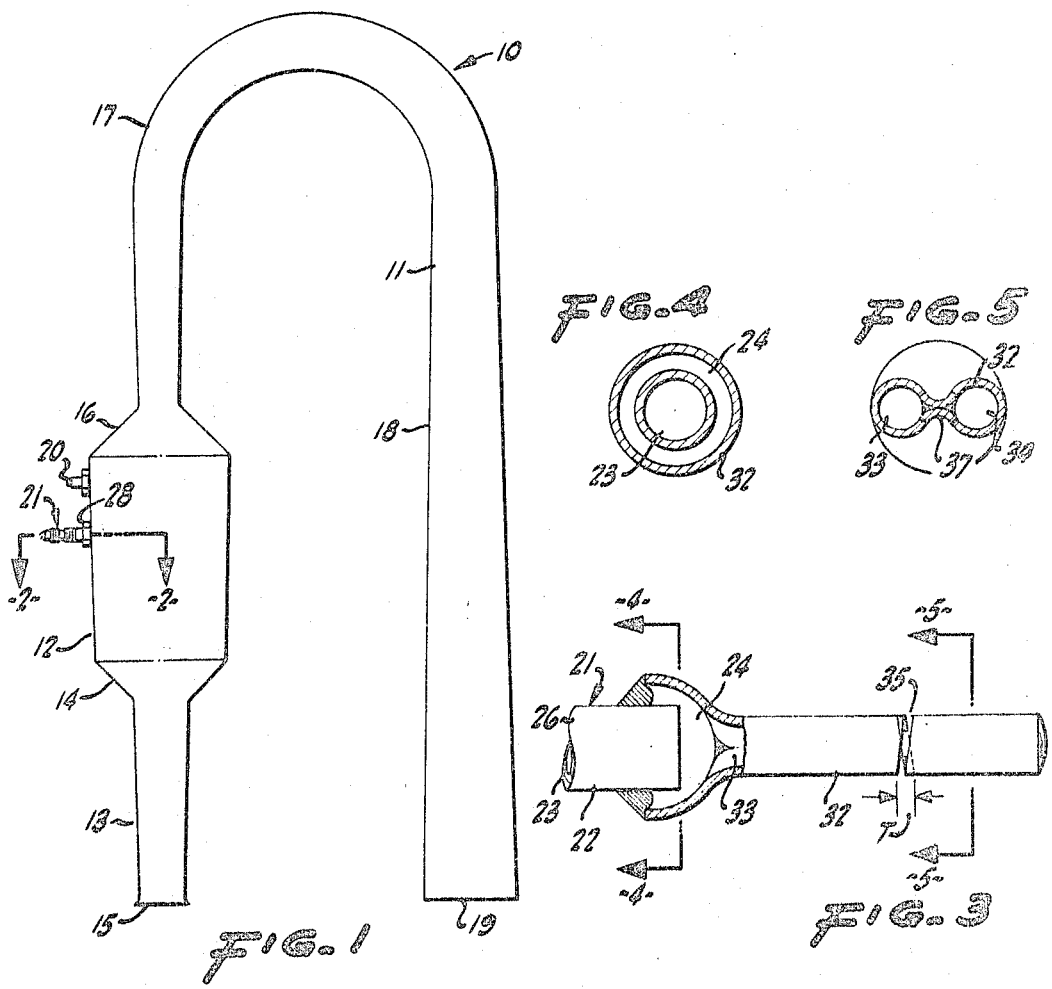
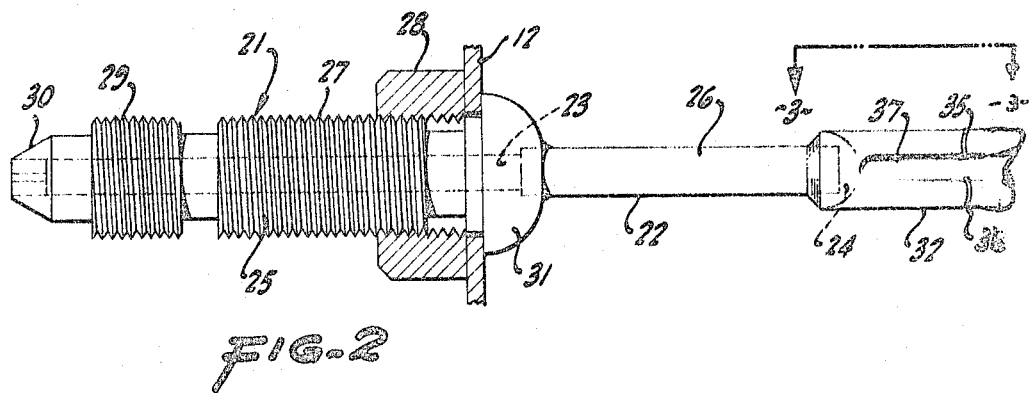

Filed June 29, 1967   2 Sheets-Sheet 2

INVENTOR
DAVID A. GRABER
BY Stanley Bialor
ATTORNEY

United States Patent Office 3,456,441
Patented July 22, 1969

3,456,441
FUEL NOZZLE
David A. Graber, Menlo Park, Calif., assignor to Fairchild Hiller Corporation, Hagerstown, Md., a corporation of Delaware
Filed June 29, 1967, Ser. No. 649,879
Int. Cl. F02g 1/06
U.S. Cl. 60—39.74                9 Claims

ABSTRACT OF THE DISCLOSURE

A fuel nozzle for supplying liquid or gaseous fuel to the combustion chamber of a valveless pulse jet engine. The nozzle includes a passage through which such fluid fuel is delivered to a plenum chamber, and the nozzle further includes discharge openings communicating with the plenum chamber for dispersing the fuel in a spray-type pattern across the combustion chamber.

---

This invention relates to a fuel nozzle and, more particularly, to a fuel nozzle structure for delivering a liquid or gaseous fuel to the combustion chamber of a pulse jet engine or the like.

As explained in Lockwood Patent No. 3,206,926, a pulse jet engine is a relatively simple structure essentially comprising an elongated hollow tube open at its ends and turned upon itself into a generally U-shaped configuration with the open ends thereof facing in the same direction. Such tube is sometimes referred to as a combustor, and intermediate the ends thereof, fluid fuel is introduced into the engine through a nozzle structure located at a section of the tube generally referred to as the combustion chamber. A sparking device is also located at such combustion chamber, and in operation of the engine, both fuel and air, the latter in sufficient volume to create a combustible mixture with the fuel, enter the combustion chamber and the sparking device is energized to ignite the mixture. Upon ignition of the mixture, the consequent expansion of the gases within the combustion chamber results in a gaseous discharge through the open ends of the engine producing thrust forces tending to propel the engine in a direction opposite to the direction of flow of the gaseous discharge.

Ignition of the fuel within the combustion chamber is accompanied by a rapidly increasing gaseous pressure therein which rises to a value tending to interrupt fuel expression from the nozzle. As the combustion gases expand outwardly from the combustion chamber for discharge through the open ends of the engine, the pressure within the combustion chamber progressively decreases until a value is reached at which a charge of fuel sprays from the nozzle and a reverse flow of the gases toward the combustion chamber is initiated. Such reversal of flow direction results in ambient air being drawn into the combustion chamber for admixture with the fuel charge therein. The combustible mixture of fuel and air is then ignited and the cycle of operation is repeated. The sparking device can be de-energized once the engine commences to run because ignition of the combustible fuel and air mixture is caused by the temperatures attained in the combustion chamber.

The discharge of fuel from the nozzle structure and into the combustion chamber is intermittent as a consequence of the cyclic change in pressure therein from a low value corresponding to the final phases of gaseous expansion during the combustion cycle to a high value corresponding to the initial phases of gaseous expansion following ignition of the combustible mixture; and the pressure at which fuel is supplied to the nozzle is selected to have a value so related to such gaseous pressures that discharge of fuel into the combustion chamber is terminated by the higher pressures therein and is permitted at the lower pressures which reduce to values less than atmospheric. Evidently then, the engine operates intermittently at a cyclic repetition rate that can vary over wide ranges and is essentially proportional to the overall length of the engine. By way of example, a typical cyclic frequency may come within the range of from about 30 cycles per second for relatively long engines to about 200 cycles per second, or more, for shorter engines—i.e., 2½ to 3 feet in length.

As concerns fuel nozzles for engines of this type, it has been exceedingly difficult to provide a nozzle which operates satisfactorily especially with the smaller sizes of pulse jet engines and, as a consequence, such engines often have been difficult to start and frequently stop operating (flame-out) for reasons that may be difficult to isolate in specific terms. It is theorized that one of the most significant causes for the inadequacy of prior art nozzles in these respects is that the structural characteristics thereof result in excess heating of the fuel while within the nozzle structure, which excess heating, in the case of a liquid fuel being delivered to the combustion chamber, causes vaporization in the nozzle structure which reduces or completely terminates the delivery of fuel to the combustion chamber, and which excess heating, in the case of a gaseous fuel, causes a pressure-increasing over-expansion thereof which similarly reduces or completely terminates the delivery of fuel to the combustion chamber.

In view of the foregoing, an object, among others, of the present invention is to provide an improved fuel nozzle structure which obviates the disadvantages of prior art structures to deliver at all times to the engine a supply of fuel adequate to maintain the same in an operational state; and which nozzle structure is inexpensive and easy to fabricate, yet is completely reliable. Additional objects and advantages of the invention will become apparent as the specification develops.

Embodiments of the invention are illustrated in the accompanying drawings in which:

FIGURE 1 is a side view in elevation of a pulse jet engine embodying the invention;

FIGURE 2 is an enlarged top plan view of the fuel nozzle structure taken along the plane 2—2 of FIGURE 1;

FIGURE 3 is a further enlarged side view in elevation of a portion of the nozzle structure, the view being taken generally along the line 3—3 of FIGURE 2;

FIGURE 4 is a transverse sectional view taken along the plane 4—4 of FIGURE 3;

FIGURE 5 is a transverse sectional view taken along the plane 5—5 of FIGURE 3.

Figure 6:
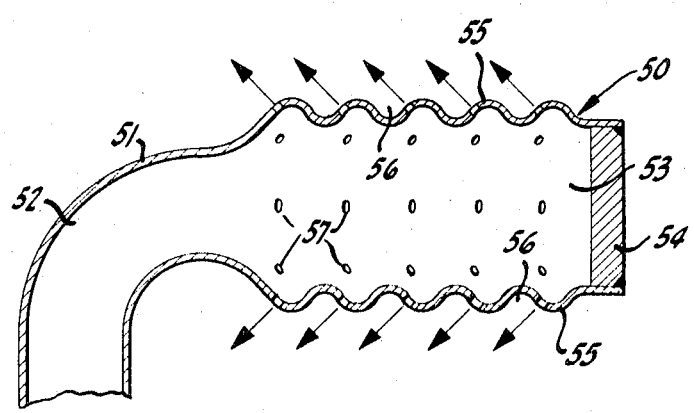
FIGURE 6 is a broken longitudinal sectional view of a modified fuel nozzle.

The valveless pulse jet engine illustrated in the drawing is designated in its entirety with the numeral 10, and includes a combustor 11 in the form of an elongated hollow tube bent upon itself to form the generally U-shaped configuration illustrated in which the open ends of the tube face in the same direction. The combustor 11 comprises therealong a combustion chamber 12 connected at one of its ends to an inlet nozzle section 13 through a transition section 14. The nozzle section 13 forms one end portion of the combustor 11 and terminates in an inlet opening 15. The combustion chamber 12 at its other end is connected through a transition section 16 and generally arcuate coupling section 17 to a tail pipe 18 terminating in an exhaust opening 19.

The engine 10 is equipped with a sparking device 20 and at least one fuel nozzle structure 21, and each such component is affixed to the engine at the combustion chamber 12 thereof and extends into the chamber. As respects the present invention, the sparking device 20 may be completely conventional and in the usual case is an electric spark plug. The nozzle 21 will be described in detail hereinafter.

As indicated hereinbefore, fuel in either liquid or gaseous form is delivered to the interior of the combustion chamber 12 via the fuel nozzle structure 21, and the engine is first started by energizing the sparking device 20 to ignite the admixture of fuel and air within the combustion chamber. However, once operation of the engine is initiated, the sparking device 20 can be de-energized because the engine will continue to operate so long as fuel is supplied thereto as a result of the high temperatures attained by the combustion chamber. Operation of the engine constitutes cyclically repetitive ignition of the fuel charges intermittently introduced into the combustion chamber 12 through the nozzle 21, and following each such ignition of the combustible mixture, the resultant gaseous expansion within the combustion chamber causes the discharge of gases outwardly through the inlet opening 15 and through the exhaust opening 19, which discharge produces thrust tending to displace the engine 10 in a direction opposite that of the direction of flow of the discharging gases. In a typical engine, the ratio of the gaseous discharge from the exhaust openings 19 to the gaseous discharge from the inlet opening 15 is about 60 to 40.

Following such outward discharge of gases through the openings 15 and 19, a reverse or inward flow commences which is due at least in part to the reduced pressure then present within the engine and particularly within the combustion chamber 12 thereof. Such reversal of flow direction induces an inflow of ambient air through the opening 15 and nozzle section 13 into the combustion chamber 12 to provide air for mixture with the fuel charge then entering the combustion chamber through the nozzle 21; and such inflow of air is attendant by considerable turbulence within the combustion chamber which produces an advantageous mixing of the air with the fuel. Such reversal of flow direction also induces an inward flow of ambient air through the exhaust opening 19 toward the combustion chamber 12. However, it has been determined that very little, if any, ambient air flowing through the tail pipe 18 toward the combustion 12 actually reaches the same before the next successive ignition cycle commences, whereupon the direction of flow is reversed. Nevertheless, such inflow of air through the opening 19 tends to pack air into the tail pipe section of the engine resulting in a greater volumetric discharge (and thrust development) than would otherwise be the case. As indicated hereinbefore, this cyclically repetitive operation of the engine continues until the supply of fuel thereto is terminated and, as previously stated, a typical frequency for an engine of this type may be in the range of from about 30 to over 200 cycles per second.

The fuel nozzle 21 is shown in detail in FIGURES 2 through 5, and referring thereto, such nozzle is seen to comprise a casing structure 22 having a supply passage 23 formed therein which is adapted to be connected with a source of pressurized fuel to deliver fuel therefrom to a plenum chamber 24 also provided by the casing structure. The nozzle casing structure 22 includes an outer connector end portion or section 25 located exteriorly of the combustion chamber 12 of an associated pulse jet engine, and it further includes an inner delivery end portion or section 26 located within the interior of such combustion chamber. The connector end portion 25 is equipped with external threads 27 for receipt thereon of a nut 28 that bears against the outer surface of the combustion chamber wall to clamp the fuel nozzle thereto. The connector end portion 25 is also equipped with a threaded segment 29 intended to cooperate with the threaded connector nut of a fuel line, not shown, which, in the conventional manner, will contain a female cone adapted to seat therein the frusto-conical tip 30 of the nozzle casing 22 so as to form a fluid-tight seal therewith.

Cooperative with the nut 28 in clamping the nozzle casing to the wall of the combustion chamber 12 is a laterally enlarged seat or abutment 31 welded, formed integrally with, or otherwise rigidly secured to the casing structure along the inner delivery section 26 thereof. The seat 31 is adapted to bear against the inner surface of the wall of the combustion chamber 12 with the result that such wall is clamped between the seat and the nut 28 to fixedly relate the nozzle to the pulse jet engine.

The orifice-equipped end portion of the nozzle delivery section 26 is denoted with the numeral 32, and extending longitudinally thereof are a pair of fuel discharge passages 33 and 34 (FIGURE 5) oriented in spaced-apart parallelism so that the longitudinal axes thereof lie in the same plane. Each such discharge passage is in open communication with the aforementioned plenum chamber 24 to receive fuel therefrom. Formed in the end portion 32 of the nozzle casing structure are orifice means constituting fuel discharge openings which, in the form shown, comprise a pair of slots or channels 35 and 36 respectively opening into the discharge passages 33 and 34. Each slot is perimetrically extending relative to the associated wall segment of the nozzle end portion 32, and in the particular structure being considered, each such wall segment and the discharge passage defined thereby is substantially cylindrical, as seen best in FIGURE 5, whereupon each discharge opening or slot forms a substantial segment of a circle. Further, as is evident in FIGURE 3, each discharge opening (or the plane defined by the center line thereof) is angularly disposed with respect to the longitudinal axis of the associated discharge passage such that the slot is slightly inclined and certain diametrically positioned points thereon are at different distances from the outer free end of the associated discharge passage.

More particularly in this respect, the two slots or discharge openings 35 and 36 are oriented relative to each other and to the discharge passages respectively associated therewith so that the center of symmetry of each discharge opening lies in the plane defined by the axes of the discharge passages 33 and 34. The discharge openings angle in opposite directions from such line of symmetry such that the center lines of such slots, except at the two points of symmetry thereof, are offset with respect to each other, wherefore fuel discharged from the two openings 35 and 36 will not be coplanar and instead will tend to lie in substantially parallel juxtaposed planes or discs.

In fabrication of the nozzle 21, a plurality of hollow tubes may be used suitably interconnected one with the others; and an assemblage of such type is advantageous in that it enables the cost of manufacture to be quite minimal. In this respect, the tubes employed may be conventional items which are susceptible of being processed in relatively simple operations, such as stamping and welding procedures. More particularly as concerns fabrication, the outer connector section 25 of the fuel nozzle is an elongated rod having a longitudinally extending passage drilled or otherwise formed therein or, alternatively, such section 25 may be a thick-wall tube in which the longitudinally extending passage therethrough is an integral part thereof. In either event, the rod or tube is equipped with the two threaded areas 27 and 29 therealong, and one end of the tube is provided with the frusto-conical tip 30 and the other end with the seat 31.

The inner discharge section 26 of the nozzle casing is in the form of an elongated tube seating at one end within an enlarged opening provided therefor in the abutment 31 and, as shown in FIGURE 2, is welded to such abutment. The end portion 32 of the nozzle casing is a hollow tube deformed about a pair of rigid bars, corresponding in diameter to the discharge passages 33 and 34, in a stamping operation to substantially close the center section 37 between the two discharge passages, as shown best in FIGURES 2 and 5. Such center deformation of the end portion 32 terminates a spaced distance from the inner end thereof receiving an end of the intermediate tube therein, which inner end forms the plenum chamber 24 about such intermediate tube. The end portion 32 of the nozzle casing is then welded to the intermediate tube to rigidify the two components and to close the plenum chamber 24. The deformed component 32 is also welded closed at its opposite outer end to seal the discharge passages 33 and 34 thereat. The discharge openings 35 and 36 are formed in such end portion 32 by cutting the same with a saw blade having, in each instance, the angular disposition necessary to provide the angular orientation desired for the discharge openings.

The modified nozzle structure illustrated in FIGURE 6 is especially useful with gaseous fuels such as methane, and such nozzle is denoted for identification with the numeral 50. This nozzle comprises a casing structure 51 having a supply passage 52 formed therein which is adapted to be connected to a source of pressurized gaseous fuel and is effective to deliver the same to a plenum chamber 53 provided by the casing structure and which, in the form thereof shown, constitutes an enlargement thereof. The end of the casing structure 51 at the outer terminus of the plenum chamber 53 is closed by an end cap or closure member 54 welded or otherwise sealingly secured to the casing structure.

That portion of the casing structure along the plenum chamber 53 and which defines the side wall thereof is corrugated so as to provide a plurality of alternately related ridges 55 and valleys or depressions 56. A plurality of discharge openings 57 are provided in the wall structure defining the plenum chamber 53 and such openings are disposed along the rearwardly facing inclined wall surfaces of the respective ridges 55 so that the gaseous fuel being expressed through all of the openings 57 is similarly directed, namely, rearwardly and away from the closure 54 and outwardly in a direction generally away from the plenum chamber 53.

Summarizing the nozzle structures described herein, each includes a supply passage which delivers fluid fuel to a plenum chamber maintained in a substantially filled condition by the fuel because of the elevated pressures at which the fuel is supplied to the nozzle structure. Also, as a consequence of such elevated pressure, fuel from the plenum chamber is discharged into the combustion chamber of the pulse jet engine 10 through discharge openings communicating with the plenum chamber. In the case of the nozzle structure 50, such discharge openings 57 communicate directly with the plenum chamber, and as concerns the nozzle structure 21, the discharge openings 35 and 36 respectively communicate with the plenum chamber 24 via the discharge passages 33 and 34.

Expression of the fluid fuel through the discharge openings and into the combustion chamber of an associated pulse jet engine occurs whenever the gaseous pressure within the combustion chamber 12 thereof is not sufficiently high to prevent this occurrence and, as explained hereinbefore, the gaseous pressure within the combustion chamber 12 cyclically varies between higher and lower pressures thereby causing the discharge of fuel into the combustion chamber to be cyclically intermittent. With each cyclic discharge of fuel, the pattern thereof with respect to the combustion chamber 12 is transversely thereacross, and because of the arrangement of the discharge openings, a somewhat planar or limited-length cylidnrical distribution of the fuel is presented so that the fuel pattern may be described as being relatively flat and disc-shaped.

Further in this respect and considering in partciular the nozzle structure 21, fuel will be expressed outwardly through the substantially continuous openings 35 and 36 in a radial pattern defining a disc or plane, and the diameter of the outwardly radiating disc of fuel will be substantially equal to the diameter of the combustion chamber and the thickness of such disc will be substantially equal to the linear distance between the outer extremities of any one of the openings 35 and 36 as such distance is measured along the longitudinal axis of the associated discharge passage 33 or 34. In more specific terms, and referring to FIGURE 3, the thickness of the fuel disc discharging from the openings 35 and 36 will be substantially equal to the dimension T. As a consequence of the oppositely-oriented angular dispositions of the two openings 35 and 36, the fuel patterns respectively associated therewith tend to be offset slightly wherever they overlap and the thickness dimension T accommodates, or is a result of, such interrelationship of the two fuel-discharge patterns. In the case of the nozzle 50, the disc-type discharge is quite thick since it extends substantially all along the length of the plenum chamber 53 and has a somewhat convex (frusto-conical) configuration because of angular disposition of the discharge openings 57.

Each nozzle structure is quite small, and considering as a specific example one embodiment of the nozzle structure 21 illustrated in FIGURES 2 through 5, the length of the entire casing section 26 to the right hand end thereof as measured from the wall of the combustion chamber 12 (FIGURE 2) is approximately 1.512 inches with the discharge openings 35 and 36 being located at a distance of approximately 0.20 of an inch from the outer right hand extremity of the casing section 26. The discharge openings 35 and 36 may each be a slot 0.006 of an inch wide and 0.065 of an inch deep, and the angular disposition of each slot as measured with respect to a plane normal to the longitudinal axis of the associated discharge passage 33 or 34 is approximately 10°. Since the discharge openings 35 and 36 extend completely across the respectviely associated discharge passages 33 and 34, each such passage evidently has a diameter of about 0.065 of an inch. The overall length of the end portion 32 of the casing structure is approximately 0.50 of an inch, and the outer diameter thereof adjacent the plenum chamber 24 is 0.1875 of an inch, and the inner diameter thereof is 0.1675 of an inch. The length of that portion of the casing section 26 interconnecting the abutment 31 and casing end portion 32 is approximately 1 inch, the outer diameter thereof is about 0.125 of an inch, and the inner diameter thereof is approximately 0.105 of an inch. In a typical instance the pressure of the fuel delivered to the nozzle structure 21 may approximate 20 p.s.i.g. and the usual range of supply pressure will be from 15 to 30 p.s.i.g.

The intermittent delivery of fuel from the nozzle structure into the combustion chamber of a pulse jet engine is readily accommodated by the nozzle structures considered herein, and in this connection, the plenum chamber provides a relatively large quantity of readily available fuel at the combustion chamber to enable a sufficient quantity of fuel to be expressed into the combustion chamber during each brief interval in which the pressure within such chamber is sufficiently low to permit this result. At the same time, however, the plenum chamber has a capacity sufficiently restricted to obviate retention of fuel therein for long periods which could result in the fuel accumulating sufficient heat by transmission thereto to effect vaporization thereof, in the case of liquid fuel, and over-pressurization in the case of gaseous fuel. Further as respects fuel vaporization, the surface areas of the nozzle structures are quite restricted and tend to minimize the amount of heat assimilated thereby and additionally, the surface areas of such nozzles are sufficiently irregular to create a degree of turbulence along the boundary layers of the ambient air entering the combustion chamber for admixture with the fuel, which turbulence is effective to maximize transmission of heat from the nozzle structure and into the ambient air, thereby reducing the buildup of heat within the nozzle structure.

While in the foregoing specification embodiments of the invention have been set forth in considerable detail for purposes of making a complete disclosure thereof, it will be apparent to those skilled in the art that numerous changes may be made in such details without departing from the spirit and principles of the invention.

What is claimed is:

1. A fuel nozzle for use in a valveless pulse jet engine or the like characterized in its operation by cyclically repetitive intermittent combustion, comprising casing structure having a fuel delivery section provided with a pair of longitudinally extending discharge passages closed at one end and open at their other end and oriented in substantially parallel juxtaposition with the longitudinal axes thereof lying in the same general plane, said casing structure further having a plenum chamber communicating with each of said discharge passages through the open ends thereof and also having a supply passage communicating with said plenum chamber to deliver fuel thereto from a pressurized source thereof, and said fuel delivery section of said casing structure being provided with a pair of fuel discharge openings intermediate the ends of said discharge passages in respective communication therewith and through which fuel is discharged into such engine, each of said fuel discharge openings being in communication with the discharge passage associated therewith at a plurality of angular locations thereabout so that a generally disc-shaped pattern is described by the fuel discharging from said openings.

2. The fuel nozzle according to claim 1 in which each of said discharge openings is a perimetrically elongated slot communicating throughout its length with the associated discharge passage.

3. The fuel nozzle according to claim 2 in which each of said slots is oriented so that a plane defined by the center line thereof is angularly disposed with respect to the longitudinal axis of the associated discharge passage.

4. The fuel nozzle according to claim 3 in which the two slots respectively associated with said discharge passages are angularly disposed in opposite directions such that the composite discharge pattern of the fuel emitted from said slots is greater in longitudinal thickness than the discharge pattern from any one of said slots.

5. The fuel nozzle according to claim 1 in which the aggregate cross-sectional areas of said discharge passages is less than the cross-sectional area of said plenum chamber.

6. The fuel nozzle according to claim 1 in which the fuel delivery section of said casing structure is a cylindrical tube deformed so as to be closed centrally along the longitudinal axis thereof and thereby define said discharge passages, such deformation terminating a spaced distance from one end of said tube to define said plenum chamber thereat.

7. The fuel nozzle according to claim 6 in which each of said discharge openings is a slot extending circumferentially about the associated discharge passage substantially from one side of the closed central portion of said tube to the other.

8. The fuel nozzle according to claim 7 in which each of said slots is oriented so that a plane defined by the center line thereof is angularly disposed with respect to the longitudinal axis of the associated discharge passage, said discharge passages being angularly disposed in opposite directions such that the composite discharge pattern of the fuel emitted from said slots is greater in longitudinal thickness than the discharge pattern from any one of said slots.

9. The fuel nozzle according to claim 6 in which the aggregate cross-sectional areas of said discharge passages is less than the cross-sectional area of said plenum chamber.

References Cited

UNITED STATES PATENTS

| | | | |
|---|---|---|---|
| 1,323,773 | 12/1919 | Kendrick et al. | 239—565 X |
| 1,499,202 | 6/1924 | Coutu | 239—565 X |
| 2,682,304 | 6/1954 | Kennedy | 239—567 X |
| 2,962,091 | 11/1960 | Sabel | 239—565 X |
| 3,044,264 | 7/1962 | Seaward et al. | 60—39.74 |

JULIUS E. WEST, Primary Examiner

U.S. Cl. X.R.

60—247; 239—568; 431—175